Feb. 9, 1937.  K. ROSENBERG  2,069,851
INCANDESCENT LAMP CINEMATOGRAPHIC APPARATUS
Filed Oct. 9, 1933  2 Sheets-Sheet 1
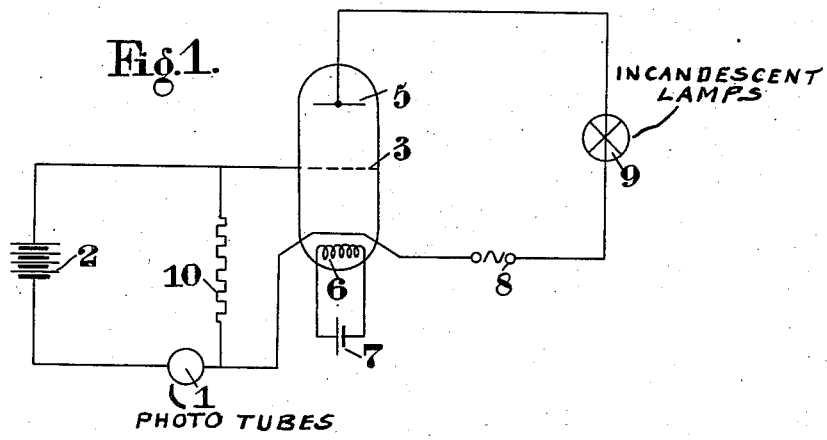
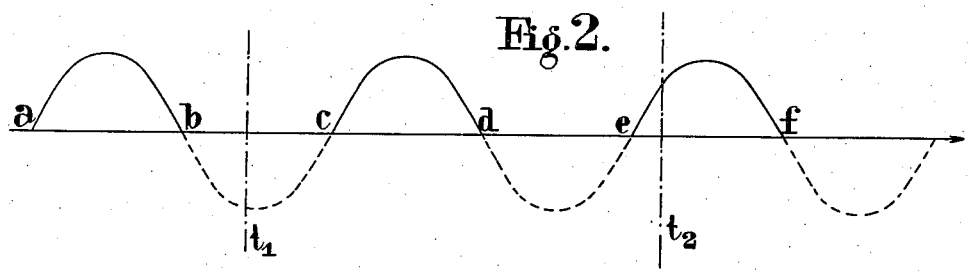
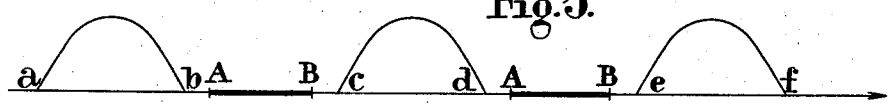
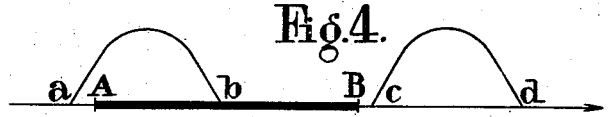
K. Rosenberg
INVENTOR
By Marks & Clerk
Attys Feb. 9, 1937. K. ROSENBERG 2,069,851
INCANDESCENT LAMP CINEMATOGRAPHIC APPARATUS
Filed Oct. 9, 1933 2 Sheets-Sheet 2
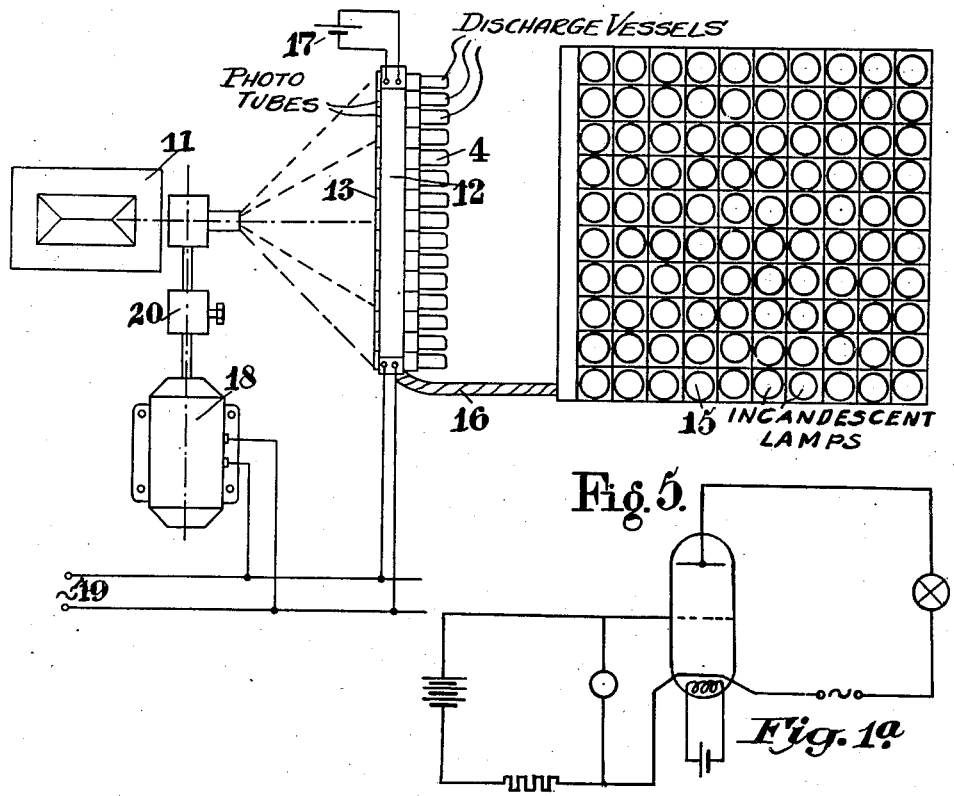

Patented Feb. 9, 1937

2,069,851

UNITED STATES PATENT OFFICE 2,069,851

INCANDESCENT LAMP CINEMATOGRAPHIC APPARATUS

Kurt Rosenberg, Berlin, Germany, assignor, by mesne assignments, to American Epok Inc., New York, N. Y., a corporation of New York Application October 9, 1933, Serial No. 692,884
In Germany October 18, 1932

5 Claims. (Cl. 177—346)

This invention relates to an apparatus for displaying pictures and communications by means of a lamp field the lamps of which are indirectly controlled by light responsive devices such as selenium cells. These light responsive devices are disposed in a field adapted to be illuminated, and means for controlling such illumination are arranged between any suitable source of light and the devices. These illumination controlling means preferably consist of a film.

It is an object of this invention to increase the efficiency of such an apparatus and of the controlling means.

It is another object of the invention to secure correct timing between the illumination controlling means and the particular means chosen by the invention for switching in an out the lamps of the banks fed by an intermittent or alternating electric current.

This and other objects and advantages of the invention will become more fully apparent from the following description with reference to the drawings.

In the drawings Figs. 1 and 1a show a particular switching element with its electrical circuit arrangement controlling the lamp of the lamp field.

Figs. 2, 3, 4 are diagrams showing the operation of the invention. Fig. 5 is a diagrammatical illustration of the apparatus, and Fig. 6 is a cross section through a preferred synchronizing device used by this invention.

Heretofore in apparatuses of this type electromagnetic relays have been used arranged in series with each of the lamps to be controlled, and a suitable source of current. The electro-magnets of these relays were controlled by light responsive devices. Such relays worked comparatively slow and were subject to arcing. They required comparatively large controlling currents.

According to this invention, discharge vessels are used instead of such electro-magnetic relays. Suitable discharge vessels became recently known for example under the name of "thyratron". These vessels comprise at least an anode and a cathode, and controlling means for the discharge.

If between an anode and a cathode of such vessel a voltage of predetermined magnitude is applied, a discharge starts between these electrodes and continues until the voltage between the electrodes either ceases or drops below a predetermined value. The start of this discharge may be prevented however by applying a predetermined voltage, or electrical charge, upon a means adapted to influence the discharge between the anode and the cathode. These means may form a grid arranged between the anode and cathode. In particular, if a gas discharge vessel of the "thyratron"-type is used, with a grid arranged between a cathode and an anode, an opposing voltage of a few volts applied to the grid suffices to prevent the start of a discharge between the electrodes. If such opposing voltage is applied to the grid however after the discharge has started, then such voltage cannot interfere anymore with the discharge and particularly alter or interrupt it. The discharge only ceases if the voltage applied between anode and cathode ceases or falls below a predetermined value.

If direct current is used for feeding the anode-cathode circuit of such a switching vessel, it is necessary to interrupt the current in order to stop the discharge. Therefore, direct current will be used for the purpose of the invention in general in the form of an intermittent current resulting in successive impulses feeding the switching vessels and the lamps connected in series with them. In order to avoid particular means for interrupting such direct current or transforming it into an intermittent one, alternating current is advantageously used.

It is known that gas discharge vessels permit the electric current to pass only in one direction from the anode to the cathode whereas they offer an extremely high resistance to the flow of current in the opposite direction. Therefore, only one half cycle of an alternating current will be permitted to pass through such a discharge vessel, whereas the other half cycle is suppressed. For convenience's sake, the half cycle which is permitted to pass such a discharge vessel from its anode to its cathode, may be called in this specification and the appended claims, a positive half-wave, whereas another half cycle of opposite direction which is practically suppressed by the electrifying action of the discharge vessel may further on be called a negative half wave.

If a positive half wave starts, it can pass the discharge gap from the anode to the cathode within the vessel, provided that no conditions are created between these electrodes preventing the start of flow of current. Such conditions may consist in a blocking voltage applied to a grid arranged between said electrodes.

Referring to Fig. 1, there is shown a circuit arrangement comprising a source of current, a discharge vessel, a lamp belonging to a lamp screen for displaying any intended picture or other communication, and a light-responsive device arranged in another screen, or field, containing the discharge vessel.

It is to be understood that the lamp shown in this figure represents a lamp group which may consist of at least a single lamp, and that a plurality of such lamp groups are to be arranged in a screen, or field. In the same way, a plurality of co-ordinated discharge vessels and controlling light-sensitive devices are to be arranged in other fields, as will be shown more in detail when the specification proceeds.

In Fig. 1, 1 is a photo-tube which is connected with the source of voltage 2 and the grid 3 of the gas discharge vessel. The other pole of the source of voltage is connected to the cathode 4 which is indirectly heated by the heating wire 6 by means of the heating battery 7. 5 is the anode. In the anode circuit, in addition to the current source 8, there is the lamp 9. 10 is an adjustable resistance for the cell.

If the cell 1 is not illuminated, there will be no voltage applied to the grid or only a small voltage which is not sufficient to act as a blocking voltage, as the main drop of voltage of the battery 2 in the grid circuit occurs at the large dark resistance of the cell 1.

The discharge may thus commence and the lamp 9 is supplied with current through this discharge device from the current source 8. The lamp is then supplied only with the positive half wave of the alternating current from the source 8, as explained above.

The resistor 10 connected across the grid 3 and cathode 4 serves for producing the voltage drop between grid and cathode. If the cell 1 is now illuminated, it now causes a higher potential to be applied to the grid, since the voltage drop at the cell 1 on account of its illumination is now small, and thus a larger voltage is applied to the grid. This is now sufficient to act as a blocking voltage and the recommencement of the glow discharge at the next positive half wave is thereby prevented. The lamp 9 is extinguished.

This switching arrangement operates so to speak "negatively", since the illumination of the cell causes the lamp to be extinguished. A film to be reproduced on a lamp field must therefore be a negative of the picture to be produced in lamp outlines.

This "negative switching" can be converted by simply exchanging the cell 1 and resistor 10 into a "positive switching", that is, when the cell 1 is illuminated the lamp 9 lights up, as shown in Fig. 1a.

The voltage drop which now occurs in the cell is in this arrangement equal to the voltage which is applied to the grid 3. The "positive switching" may readily be explained as follows:

If the cell 1 is not illuminated, on account of its high dark resistance there is a large voltage drop in it and therefore at the grid 3. The gas discharge vessel can therefore not pass current and the lamp 9 is not lit up when the cell 1 is not illuminated.

When the cell 1 is illuminated its inner resistance is considerably reduced and so small that there is only a small drop of voltage across it, as the main drop of voltage occurs in the high resistance 10. Therefore the voltage previously applied to the grid 3 which was sufficient to prevent any flow of current between the anode and the cathode, disappears and practically no opposing voltage (or at most only a small one, which is not sufficient to prevent flow of current) is present so that the gas discharge vessel can be ignited. The lamp 9 therefore lights up when the cell is illuminated ("positive").

Fig. 2 shows the time curve of an alternating current. If such a voltage is applied to the anode of a grid-controlled gas discharge vessel ("thyratron"), the positive half waves $ab$, $cd$, $ef$ and so forth will flow through the gas discharge vessel and the lamp connected in series and thereby co-ordinated with it, while the negative half wave $bc$, $de$, $fg$ and so forth, which are shown in broken lines, are suppressed by the rectifying action of the gas discharge vessel.

If, for example, at the moment $t_1$, a blocking potential is applied to the grid of the gas discharge vessel, so that the gas discharge vessel cannot be ignited at the next positive half wave $cd$, the lamp will thus no longer light up.

If the blocking voltage is applied for example at the moment $t_2$, the passage of current through the gas discharge vessel and consequently through the lamp will continue carried by the discharge which commenced at $e$, until the moment $f$ when the lamp will be extinguished.

The sequence of events at the removal of the blocking voltage is similar. If this is removed at the moment $t_1$ the discharge will commence at $c$ and the lamp will then light up. If the blocking voltage is removed at the moment $t_2$ the glow discharge will commence immediately at this time and the lamp will immediately light up, since at this moment $t_2$ in contradistinction to the moment $t_1$ there is a potential difference between the cathode and anode.

The application or removal of the blocking voltage occurs as explained above, as a result of the illumination or other activation of the photo-cells co-ordinated with the individual gas discharge vessels. The illumination or other activation is effected by the projection of the separate film pictures, that is, in a frequency corresponding to the speed of the film.

This "film picture frequency" is as a rule different from the frequency of the alternating current flowing in the anode circuit of the gas discharge vessel. Therefore the instants $t$ (Fig. 2), which correspond to the application or removal of the blocking voltage, will have a continually varying displacement in time with respect to the positive half waves $ab$, $cd$ and so forth of the alternating current.

From this result, for the picture to be transmitted upon the lamp field, irregularities in time with respect to the time during which each picture frame appears, which as above described are due to the inaccuracies in blocking or ignition.

This undesirable effect which occurs when the projector transports the film to be projected from one picture frame to the other may be explained by the action of the rotating shutter. This shuts off the ray of light from the projector during the movement of the film, so that all the cells are in the dark for a short time. According to the temporal position of this absence of illumination with respect to the alternating current frequency irregularities will arise. If the "negative switching method" is employed (lamps dark while cells are illuminated), all the lamps will light up for a short time between two separate picture frames when the absence of illumination falls within a positive half wave.

With the "positive switching method" (lamps lit up when cells are illuminated), the lamps which are lit up for the picture will be extinguished for a short time, so that the picture will flicker.

These advantages are avoided if according to

Fig. 3 the film transport time AB lies within the time of a negative half wave bc, de and so forth. The absence of illumination can then produce no ill effects because during these periods bc or cd and so forth no discharge through the gas discharge vessel is possible, because of its rectifying action, no current can pass. If the film transport time, i. e. also dark interval caused by the shutter ends at B, that is the next picture frame begins, the shutter allows the beam of light to pass and the cells are illuminated or other activation corresponding to the picture frame and the blockages and ignitions produced thereby commence at the instants c or e. In this manner a completely uniform and steady picture will appear on the lamp field.

According to the speed of the film the film transport (dark interval) will occur for example within each successive negative half wave or in the second or third negative half wave; it is only necessary that the picture frame frequency and the alternating current frequency should have an integral relation one with the other.

If the picture frequency is diminished the dark interval will be increased, if the projector gearing is left unaltered. If the dark interval becomes longer than a single half wave (Fig. 4) it will be of advantage to have the beginning of the dark interval AB, for example within the first half of the positive half wave ab, which precedes the negative half wave, which in this instance is assumed to produce the switching effect.

By the removal of illumination at A the state of the gas discharge vessel during the time ab is not changed, because at the instant A the gas discharge vessel, in the case in which the co-ordinated lamp in the picture is to be lit up, has already lit up and the removal of illumination, which with "positive switching" corresponds to the application of a blocking voltage, cannot interrupt the discharge through the gas discharge vessel, as above described.

In addition the instant B may be displaced without detrimental effect to c, as during the interval bc no current can pass the gas discharge vessel. Thus practically the time of a complete wave is available for switching.

If a still smaller picture frequency is employed, so that the film transport time produced by the rotating shutter becomes greater than a complete wave, the gearing of the projector must be suitably altered.

It thus appears that the time of the film transport time must be shorter than the time of a cycle and that the beginning of a film transport time must occur at the earliest shortly after the commencement of the positive half wave (until the gas discharge vessel has ignited if the picture requires it) and the end must occur at the latest at the instant of the commencement of the following positive half wave. In this way a completely steady picture is obtained when using alternating current.

In order to obtain these advantages it is necessary that there should be synchronism between the film picture frequency and the alternating current frequency, and a definite phase relation between the two frequencies. The synchronism is obtained in a simple manner, for example by driving the film projector with a synchronous motor which is fed by the same alternating current as the lamps and gas discharge vessels.

Fig. 5 shows as an example a diagram of the arrangement of the whole of the incandescent lamp cinematograph. 11 is the film projector, which projects the film picture on to a panel 12 which carries on the front side the cells 13, while on the rear side thereof the gas discharge vessels 14 co-ordinated with the cells are arranged. 15 is the lamp field, the lamps of which are connected through the cable 16 with the appropriate gas discharge vessels. The battery 17 serves for feeding the cell grid circuit of the gas discharge vessels. 18 is the driving motor of the projector which is constructed as a synchronous motor and is fed from the same alternating current supply 19 as the lamp field 15.

In order that the phases of the alternating current frequency and the film picture frequency can be relatively varied for regulating the film transport time in the projection during the period of a negative half wave, the synchronous motor and the projector are for example coupled through a rotatable coupling, as indicated at 20 in Fig. 5. In Fig. 6 a planet wheel gear (differential gear) is illustrated diagrammatically as an example of a rotatable coupling. The synchronous motor 18 (Fig. 5) is for example coupled to the shaft 21, while the projector 11 (Fig. 5) is connected with the shaft 22 (Fig. 6). The two shafts 21 and 22 have bevel wheels 23 and 24 keyed thereto. The bridge shaft 25 has the two bevel wheels 26 and 27 mounted loosely thereon. The shaft 25 is held in the frame 28 which at 29 and 30 is formed as a bearing for the shafts 21 and 22. The shaft 25 is secured by means of the worm 32 and the worm-wheel 31 screwed on to the frame 28. By turning the worm 12 the shaft 25 can be turned. If the shaft 25 is stationary, the two shafts 21 and 22 are positively coupled together. By turning the shaft 25, however, a relative rotation of the shafts 21 and 22 by the known differential action is obtained.

By regulation (rotation of the shaft 25 from the outside by means of the worm gearing 32 and 31) by means of such a coupling, it is easy to obtain the correct adjustment of the phases, which is recognized by the appearance of a steady and regular picture on the lamp field.

The advantage over the mechanical relays consists in that the gas discharge vessels have no inertia and that they have no mechanically moving parts like the relays, and consequently require no attention.

Also the control of the gas discharge vessels offers advantages as regards the selection of the cells which are necessary for the operation. While for the operating relays cells are necessary which when illuminated give about 5 m. a., for the grid control voltages of a few volts only are required and the amount of current does not come into question. Consequently alkali cells can be used for operating the incandescent lamp cinematograph, which are not suitable for use with mechanical relays as they only give a current of a few microamperes.

Further in order to obtain a change in voltage at the grid by means of the cells, only a small intensity of illumination is necessary, so that in this way advantages in the operation of the film projector are obtained.

What I claim is:

1. A system for displaying pictures and communications by means of a lamp screen comprising lamp groups, each group consisting of at least one lamp; a source of alternating current; discharge vessels comprising at least one anode and a cathode forming a discharge gap, and a controlling electrode, said electrode blocking the start of flow of current through said gap at a certain voltage, each of said electrodes, a lamp group and said source of alternating current connected in series; light responsive devices disposed in a screen adapted to be illuminated; a source of blocking voltage, each of said devices interconnected between an electrode each and said source of blocking voltage; means having several conditions of operation for controlling the illumination of said devices; and means for shifting the last mentioned means from one condition to another one only after the start of a positive half wave and prior to the termination of a successive negative half wave of said source of alternating current.

2. A system for displaying pictures and communications by means of a lamp screen comprising lamp groups, each group consisting of at least one lamp; a source of alternating current; discharge vessels comprising at least one anode and a cathode forming a discharge gap, and a controlling electrode, said electrode blocking the start of a discharge through said gap at a certain voltage, each of said electrodes, a lamp group and said source of alternating current connected in series; light responsive devices disposed in a screen adapted to be illuminated; a source of blocking voltage, each of said devices interconnected between an electrode each and said source of blocking voltage; stepwise movable means for permitting the desired illumination of said devices while stationary; means for operating said movable means so that said latter means will start their movement only after the start of a positive half wave and terminate their movement prior to the end of a subsequent negative half wave of a cycle of said alternating current.

3. A system for displaying pictures and communications by means of a lamp screen comprising lamp groups, each consisting of at least one lamp; a source of alternating current; discharge vessels comprising at least one anode, a cathode and a controlling electrode, said electrode blocking the start of a discharge at a certain voltage, each of said vessels and lamp groups and said source of alternating current connected in series; light responsive devices disposed in a screen adapted to be illuminated; a source of blocking voltage, each of said devices connected in series with an electrode each and said source of blocking voltage; means having different conditions of operation for controlling the illumination of said devices; means for shifting said controlling means from one condition to another one, comprising a synchronous motor to be fed by said source of alternating current and an adjustable phase changing device, said latter device capable of changing the phase position of said controlling means relative to said motor with respect to said alternating current, whereby start and termination of operation of said shifting means with respect to said alternating current is controlled so that said termination occurs during the negative half-waves of said alternating current source.

4. An apparatus for displaying pictures and communications by means of a lamp screen comprising lamp groups, each group consisting of at least one lamp, said apparatus to be operated by a succession of electrical current impulses separated by an interval; discharge vessels comprising at least one anode, a cathode and an auxiliary electrode, said electrode controlling the start of the discharge by the voltage to be applied thereto, each of said vessels and lamp groups connected in series with respect to the said current impulses; light responsive devices disposed in a screen adapted to be illuminated, each of said devices connected in series with an electrode each and means for connecting said device with a source of controlling voltage; means having different conditions of operation for controlling the illumination of said devices; means for changing one of said conditions into another one, comprising a synchronous motor to be fed by said current impulses and an adjustable phase changing device, said latter device capable of changing the phase position with respect to said current impulses, whereby start and termination of operation of said changing means with respect to said current impulses are controlled so that said termination occurs between said impulses.

5. An apparatus for displaying pictures and communications by means of a lamp field to be operated by a succession of electrical intermittent current impulses, comprising lamp groups arranged in a field, each group consisting of at least one lamp; discharge vessels comprising at least one anode and a cathode electrode and means controlling the discharge between said electrodes, each of said vessels and a lamp group each connected in series with respect to said current impulses; light responsive devices disposed in a field adapted to be illuminated, each of said devices interconnected with one of said controlling means each and means for connecting said devices with a source of controlling voltage; means having different conditions of operation for controlling the illumination of said devices; means for changing one of said conditions into another one, comprising a synchronous motor to be fed by said current impulses and an adjustable phase changing device, said latter device capable of changing the phase position with respect to said current impulses, whereby start and termination of operation of said changing means with respect to said current impulses are controlled so that said termination occurs between said impulses.

KURT ROSENBERG.